United States Patent
Kranz et al.

(10) Patent No.: US 9,545,876 B2
(45) Date of Patent: *Jan. 17, 2017

(54) ON-BOARD LOW-POWER VEHICLE CONDITION INDICATOR

(71) Applicant: STEMCO LP, Longview, TX (US)

(72) Inventors: Mark J. Kranz, Longview, TX (US); Michael James Massey, Longview, TX (US); Daniel J. Harding, Longview, TX (US)

(73) Assignee: STEMCO LP, Longview, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,024

(22) Filed: Jun. 23, 2015

(65) Prior Publication Data

US 2015/0291083 A1 Oct. 15, 2015

Related U.S. Application Data

(63) Continuation of application No. 12/617,433, filed on Nov. 12, 2009, now Pat. No. 9,090,206.

(Continued)

(51) Int. Cl.
*B60Q 1/26* (2006.01)
*B60C 23/00* (2006.01)
(Continued)

(52) U.S. Cl.
CPC .............. *B60Q 1/26* (2013.01); *B60C 23/009* (2013.01); *B60C 23/0406* (2013.01);
(Continued)

(58) Field of Classification Search
CPC .............. B60C 23/009; B60C 23/0406; B60C 23/0408; B60C 23/00; B60C 23/0493; B60Q 1/305; B60Q 1/50; B60Q 1/2665; G07C 5/008; G07C 5/085; B60R 19/483; B60R 16/0231; G09F 9/33; B60W 50/14; G01C 21/26
(Continued)

(56) References Cited

U.S. PATENT DOCUMENTS 5,572,021 A 11/1996 Heathman et al.
5,572,201 A * 11/1996 Graham ............... G08G 1/0965
340/901

(Continued)

FOREIGN PATENT DOCUMENTS

WO WO9406640 * 3/1994
WO WO-9406640 A1 3/1994

OTHER PUBLICATIONS

Notification of Transmittal of the International Search Report and the Written Opinion of the International Searching Authority, or the Declaration for PCT/US09/64202 mailed Jan. 22, 2010.

*Primary Examiner* — Mirza Alam
(74) *Attorney, Agent, or Firm* — Perkins Coie LLP

(57) ABSTRACT

A monitoring unit wirelessly monitors sensor(s) associated with a vehicle and includes (a) a radio frequency (RF) receiver that receives RF signals from one or more sensors; (b) a processing unit connected to the RF receiver that monitors information related received RF signals from the sensor(s); (c) the processing unit monitoring the received RF signals and a status of an output of the sensor(s) associated with the vehicle. The received RF signals may include information on a value of an output of the sensor and limits of acceptable values, and the processing unit generates an alarm when the value of the output is outside of the limits of acceptable values. The alarm may be a visual indication visible from the exterior of the vehicle.

16 Claims, 5 Drawing Sheets

Related U.S. Application Data

(60) Provisional application No. 61/113,867, filed on Nov. 12, 2008.

(51) Int. Cl.
 *B60C 23/04* (2006.01)
 *B60Q 1/30* (2006.01)
 *B60Q 1/50* (2006.01)

(52) U.S. Cl.
 CPC .......... *B60C 23/0408* (2013.01); *B60Q 1/305* (2013.01); *B60Q 1/50* (2013.01); *B60Q 2900/30* (2013.01)

(58) Field of Classification Search
 USPC .............. 340/463, 438, 425.5, 442, 488, 992, 340/815.53, 902; 701/29.2, 29.7, 29.9, 63; 40/452; 361/719, 722
 See application file for complete search history.

(56) References Cited

U.S. PATENT DOCUMENTS

| | | |
|---|---|---|
| 6,434,458 B1 | 8/2002 | Laguer-Diaz et al. |
| 7,026,922 B1 | 4/2006 | Talukder et al. |
| 2002/0008718 A1 | 1/2002 | Obradovich |
| 2003/0041492 A1 | 3/2003 | Weinacht et al. |
| 2003/0095028 A1* | 5/2003 | Tamezawa .......... H01F 17/0013 336/200 |
| 2003/0095038 A1 | 5/2003 | Dix |
| 2005/0005487 A1* | 1/2005 | Gray ...................... G09F 21/04 40/452 |
| 2005/0040941 A1* | 2/2005 | Schofield ............ B60C 23/0401 340/442 |
| 2006/0142913 A1* | 6/2006 | Coffee ................... B28C 5/422 701/29.3 |
| 2006/0244581 A1 | 11/2006 | Breed et al. |
| 2008/0284575 A1 | 11/2008 | Breed |
| 2010/0117817 A1 | 5/2010 | Kranz et al. |
| 2010/0207754 A1 | 8/2010 | Shostak et al. |

\* cited by examiner

ON-BOARD LOW-POWER VEHICLE CONDITION INDICATOR

CROSS-REFERENCE TO RELATED APPLICATION(S)

This application is a continuation of U.S. patent application Ser. No. 12/617,433, filed on Nov. 12, 2009, now U.S. Pat. No. 9,090,206, entitled "ON-BOARD LOW-POWER VEHICLE CONDITION INDICATOR" and claims the benefit of U.S. Provisional Patent Application No. 61/113,867 filed on Nov. 12, 2008, entitled "ON-BOARD LOW-POWER VEHICLE CONDITION INDICATOR," the disclosures of which is incorporated herein by reference in their entirety.

TECHNICAL FIELD

The present invention is related to visible vehicle condition indicators, and more specifically to condition indicators using wireless identification and monitoring of remote sensors to determine vehicle condition.

BACKGROUND

Vehicle safety and efficiency are concerns for any vehicle operator. Safety is important for the operator of a vehicle, for the passengers in the vehicle, and for others that share the road with the vehicle. Safe vehicle operation also may reduce vehicle repair costs and downtime. Efficiency also is important for the vehicle operator and the vehicle owner. Efficient vehicle operation may reduce operating and maintenance costs associated with a vehicle, thereby improving profit margins for a business that operates vehicles. Components that contribute to both vehicle safety and efficiency include axle components and drive train components. Axle components include wheels, wheel hubs, pneumatic tires, suspension components, braking components, and the like. Drive train components include a vehicle engine and components that transfer power from the engine to the drive wheels of the vehicle.

Proper maintenance of the vehicle is important to safe and efficient operation of the vehicle. Proper maintenance includes proper lubricant fluid levels, proper replacement of fluids, proper tire pressures, and the like. In the case of a pneumatic tire, for example, improper air pressure in the tire can reduce safety due to an increased likelihood of a failure of the tire due to increased heating and/or increased or uneven tread wear. Improper air pressure can also increase costs associated with operating the vehicle due to reduced life of the tire, thereby increasing replacement costs, and also increased rolling friction that reduces fuel economy of the vehicle and increases fuel costs. Similarly, if a lubricant fluid level is low or if the lubricant has become contaminated or broken down, continued operation of the vehicle may result in costly repairs and reduced fuel economy. Tire pressure and lubricating fluid level are but two examples of vehicle components that may influence vehicle safety and efficiency.

Accordingly, an important aspect with respect to operating any vehicle is the proper maintenance of various components to ensure proper vehicle performance. In the case of an entity that operates a number of different vehicles, such as a trucking company, such maintenance is particularly important to ensure that costs associated with vehicle operation are not unnecessarily increased. However, in many cases the volume of maintenance checks and the time required to perform such checks, coupled with shipping and delivery deadline pressures, results in such checks being performed less often than is ideal. Additionally, the value of maintenance checks to confirm proper vehicle conditions offset some of the benefits of properly maintained vehicles due to the costs associated with performing such checks. Furthermore, in many cases sensors may be coupled to a trailer that is parked in a lot with a number of other trailers, further increasing the number of and time required for checking the status of various components.

SUMMARY

Embodiments disclosed herein provide systems and methods for monitoring the status of sensors that sense the parameters of one or more vehicle components and providing a visual indicator of the status. A monitor in a first vehicle receives RF signals from sensors that are located remotely from the monitor. The sensors may be associated with vehicles other than the first vehicle, and it is desired to monitor only the sensor(s) that are also associated with the first vehicle. Sensors may be selected for monitoring by reading a plurality of different sensors and selecting one or more sensors from the plurality of sensors that are to be monitored. Sensors that are to be monitored are selected based on programming of the monitor when the monitor or sensors are installed.

In one aspect, an apparatus provided that monitors one or more sensors associated with the vehicle, comprising (a) a radio frequency (RF) receiver that receives RF signals from one or more sensors; (b) a processing unit operably interconnected to the RF receiver that monitors information related received RF signals from the one or more sensors; (c) the processing unit being operable to monitor the received RF signals and monitor a status of an output of the sensor(s) associated with the vehicle. The RF receiver may receive RF signals from a plurality of sensors, with the one or more sensor(s) associated with the vehicle being a subset of the plurality of sensors. In an embodiment, the received RF signals include information on a value of an output of the sensor and limits of acceptable values, and the processing unit is further operable to generate an alarm when the value of the output is outside of the limits of acceptable values. The alarm may be a visual indication visible from the exterior of the vehicle. The monitoring apparatus may include a self-contained power supply that provides power to the apparatus for the lifetime of the apparatus. In some embodiments, the lifetime of the power supply is not affected by the number of sensors monitored by the apparatus. In some embodiments, the RF receiver is activated during an adaptive listening envelope that includes an expected transmission time of an RF signal from an associated sensor. In some embodiments, the visual alarm indicator requires power to change the state of the display and does not require power when the state of the display state is not being changed. Such a visual alarm indicator may comprise a flip-dot display. The remote sensor(s) may be associated with a vehicle tire, vehicle hub, and/or vehicle axle, for example. In another embodiment, the apparatus further comprises a telemetry unit operably interconnected to the processing unit and operable to communicate a status of the one or more identified sensors to a remote system that monitors a fleet of vehicles.

In another aspect, the present disclosure provides a system for monitoring a property of a vehicle. The system of this aspect comprises (a) at least one sensor unit associated with the vehicle axle, the sensor unit comprising: (i) a sensor that is operably interconnected with the vehicle axle and that outputs a value corresponding to the sensed parameter of the vehicle; (ii) a radio frequency (RF) transmitter operably interconnected to the sensor that transmits the output of the sensor; and (b) a monitor, comprising: (i) a RF receiver that receives RF signals from one or more sensor units; (ii) a processing unit operably interconnected to the RF receiver that monitors information related received RF signals from the one or more sensor units; and (iii) a visual indicator that changes state when information from a received RF signal indicates a parameter is outside of a predetermined limit.

Another aspect of the disclosure provides a visual indicator mounted a vehicle in a location visible to an individual located outside of the vehicle. In the event that a sensor associated with the vehicle indicates a fault condition in the associated component, a visual indication of the sensor status is provided. The visual indicator in this aspect receives information regarding the sensor status wirelessly, and is powered by a self-contained power supply, such as one or more batteries. The visual indicator is operable to identify the particular sensors that are associated with the vehicle, and thereby also ignore signals of other vehicle sensors that may be nearby. In one embodiment, to provide low power operation, an RF receiver determines timing of expected communications from the sensors located on the vehicle and power is provided to the RF receiver only during times where the signal is expected to be received from the sensors. The visual indicator may include a controller that learns when the vehicle sensor(s) are to transmit information, and also may monitor the timing of such transmissions to determine a drift rate of the transmissions in order to further adjust the timing of powering the RF receiver. The visual indicator may adapt to the number of sensors that are monitored on the vehicle in such a way as to keep maximum responsiveness and a constant power usage. The visual indicator may be mounted using adhesive, thus allowing for relatively fast and efficient installation and retrofit to existing systems. The visual indicator may use one or more inertial sensor(s) to determine when a vehicle is moving and stopped.

DETAILED DESCRIPTION

Figure 1:
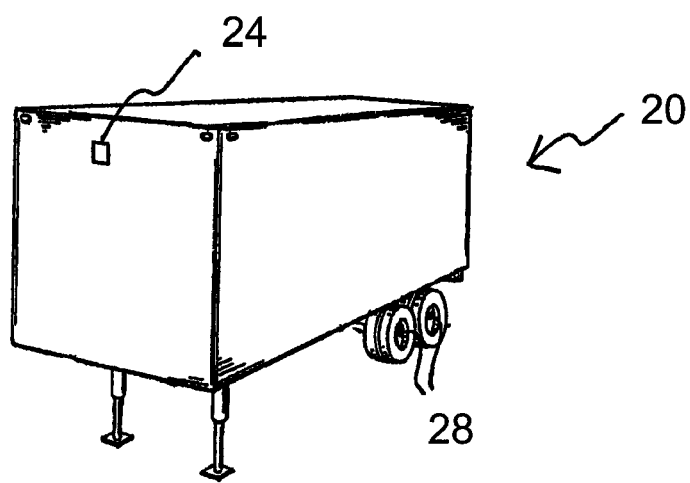
FIG. 1 is a perspective view of a trailer having a vehicle condition indicator of an embodiment of the present disclosure.

The present disclosure recognizes that existing vehicle component sensors generally require (1) access to the sensor, or (2) access to a reader or power to read the sensor. Each of these requirements may present a problem when a vehicle is located among numerous other vehicles that also have component sensors. For example, an individual that is tasked with determining if one or more vehicles in a fleet may be required to approach every sensor in the fleet of vehicles to make such a determination. Existing systems may have devices located in a vehicle cabin that wirelessly read the sensors, however such systems require an individual to be located within the cabin to determine the status of the sensor(s).

Furthermore, in cases where the cabin is in a truck and sensor(s) are associated with a trailer, the system may cease to operate or only operate for a limited period of time when the trailer is disconnected from the truck. In some systems employed by trucking industries, sensor status is determined through a powered system, and in the event that a trailer is not connected to a truck, such powered sensor systems require difficult or time consuming connection to the trailer or truck wire harnesses, thus creating more failure modes and additional cost.

Some sensors give an indication of sensor status through a visual indication at the sensor itself, however the indication can only be seen when the user is directly in front of the sensor. Such visual review of sensors may be difficult or impossible when multiple vehicles are parked closely next to each other, such as is common with trailers that are often parked with less than 12 inches of spacing between adjacent vehicles. It is common in trucking industries to have numerous trailers, often 100 or more, in a yard, which results in no real knowledge of the condition of the trailer sensor(s) until the particular trailer is connected to a truck to be used. At that time though, any repairs are time consuming and unplanned so may cause delays in shipping of the cargo.

The present disclosure provides a device that displays status information on the exterior of the vehicle, such as the front of a trailer. Such a monitoring and status indication device may have a first visual state when no sensors are reporting a condition outside of set limits, and a different visual state when a sensor reports an out-of-limit condition. In such a manner, an observer or maintenance truck can simply drive along a row of parked vehicles and visually identify any vehicles in need of maintenance. Identified vehicles may have any necessary maintenance performed, and be ready for service when needed. The visual indicator, in some embodiments, may be programmed to learn sensors that are to be monitored, thereby monitoring only sensors that are located on the associated vehicle, rather than sensors that may be located nearby on other vehicles. The visual indicator, in other embodiments, is battery operated with the battery designed to last the lifetime of the visual indicator. The visual indicators in some embodiments is mounted to the exterior of the vehicle with adhesive, such as double-sided tape, providing for an efficient installation.

With reference now to the drawing figures, various exemplary embodiments of the present disclosure are described. With reference first to FIG. 1, a vehicle 20 is illustrated with a visual indicator 24 mounted on the front of the vehicle 20. In this embodiment, the vehicle 20 is a trailer that is adapted to be coupled to a truck to haul cargo. The visual indicator 20 provides a warning indicator on the nose of the semi-trailer vehicle 20, such that an individual located external to the trailer 20 may easily observe the indicator 24. The visual indicator 24 receives RF signals from one or more sensors 28 that are associated with the vehicle 20. In this embodiment, the sensors 28 are air pressure sensors that sense the air pressure in associated tires. The sensors 28 are capable of transmitting sensor information through RF communications. The sensors 28 may be programmed with limits for high and low pressure, and transmit an indication when a current reading of the sensor is outside of the programmed limits. The radio frequency (RF) transmission, and associated reception, related to such sensors is well known in the art, and the details related to such RF transmissions will not be discussed in detail here. As will be readily recognized by one of skill in the art, various other sensors (e.g., fluid sensors, brake wear sensors, weight sensors, etc.) may be associated with various components of the vehicle 20, and air pressure sensors are discussed here for purposes of providing one example of such a system. In this embodiment, the visual indicator 24 is a binary indicator that provides an indication when one or more sensors 28 that are monitored by the visual indicator 24 indicates a sensor reading that is outside of tolerances for the sensor 28. The visual indicator 24 is programmed to identify sensors 28 that are mounted to vehicle 20. This is accomplished, in an embodiment, through hard binding the visual indicator 24 to sensors 28 (and/or other RF sensors) on the vehicle 20. As used herein, hard binding refers to the programming of the indicator to monitor specific sensors, and ignore signals from other, non-bound, sensors. The list of monitored sensors is static until the indicator 24 is programmed with different information. The visual indicator 24 provides a static, effectively zero power, indicator of the sensor condition that is easily seen from a distance. The low power visual indicator 24, in various embodiments, monitors a variety of sensors 28 for years at a time and presents warning information at the exterior of the vehicle that is easily seen by an individual without the need to access the vehicle or access specific components of the vehicle.

Figure 2:
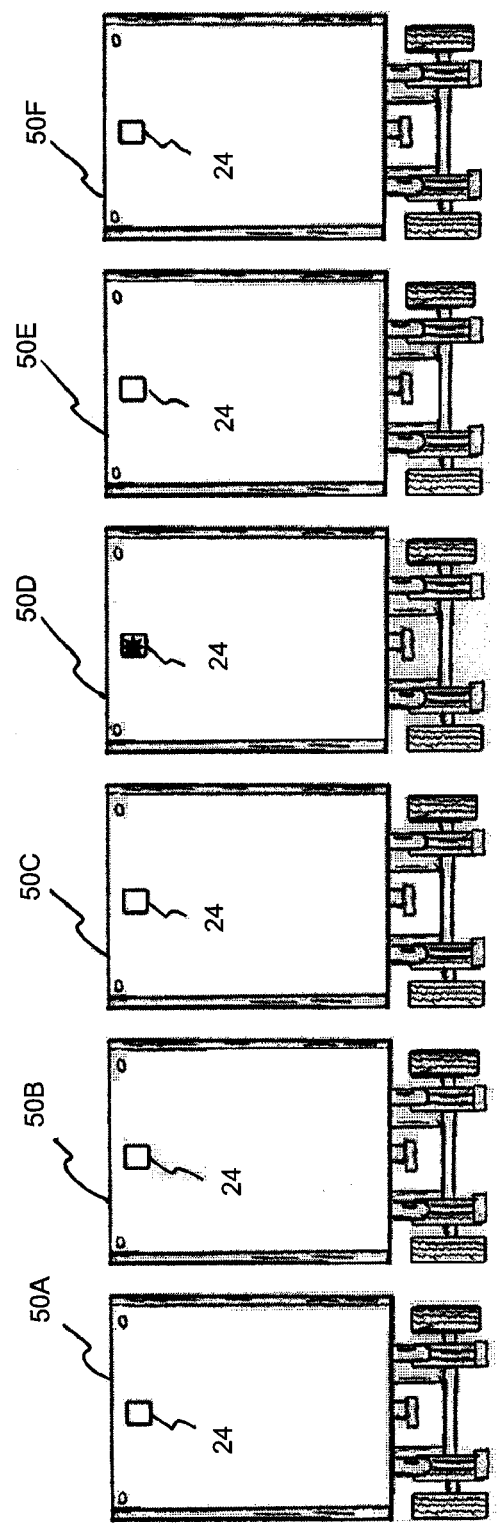
FIG. 2 illustrates a plurality of trailers equipped with vehicle condition indicators of an embodiment.

For example, in FIG. 2, six trailers 50A through 50F are parked side-by-side in a yard. Each trailer 50 includes a visual indicator 24 that provides an indication of the status of sensor(s) that are mounted to the trailer 50. In this example, the visual indicator 24 associated with trailer 50D is in a state that indicates one or more of the monitored sensors is reporting a sensed condition that is outside of a preset limit of the sensor. Appropriate action may then be taken with respect to trailer 50D. By providing an early indication of a sensed condition that is outside of predetermined limits, appropriate corrective action may be taken on the particular trailer, thus providing a trailer that is ready to be used in service when the time comes. Such a system reduces extra time that may be required to correct the problem when the trailer is needed. As is well known, using such a vehicle when vehicle condition is out of tolerances can result in efficiency and/or safety problems.

Figure 3:
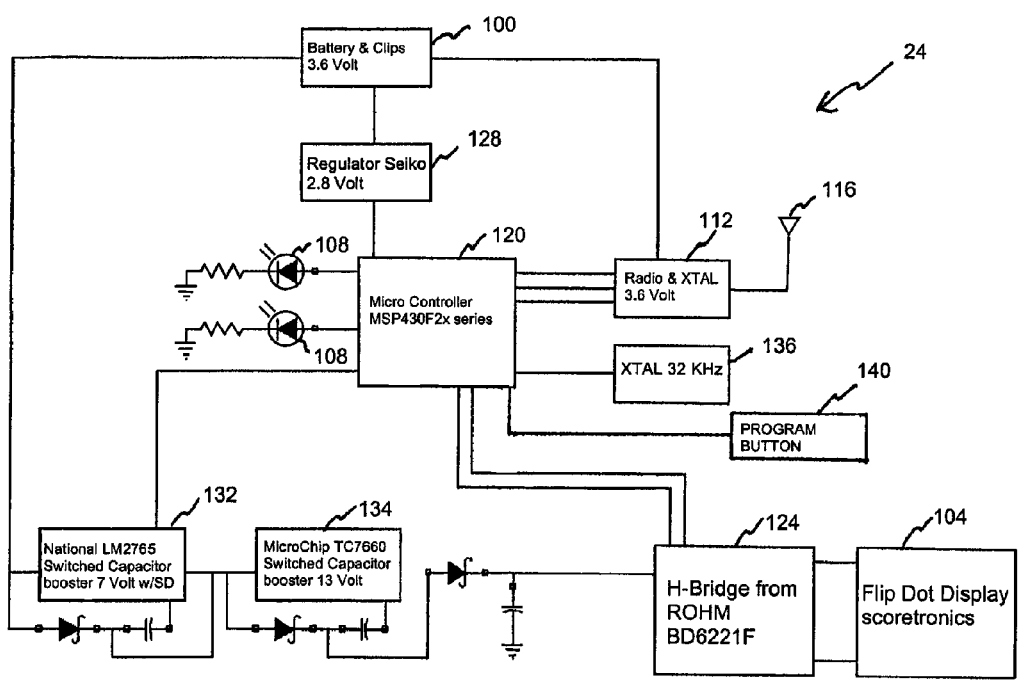
FIG. 3 is a schematic diagram illustrating the electronic components of a vehicle condition indicator of an embodiment.

FIG. 3 provides a block diagram illustration of the components of a visual indicator 24 of an embodiment. In this embodiment, the visual indicator is a wireless receiver that is powered by batteries 100 that are good for the life of the product. This battery operation allows for fast and efficient attachment to a vehicle without affecting wiring harnesses on the vehicle. The visual indicator 24, in some embodiments, uses an electromechanical flip dot 104 to indicate status, combined with one or more LED's 28. A radio system 112 within the visual indicator 24 receives incoming messages from sensors through an antenna 116. In one embodiment, the radio system 112 carefully times incoming messages from sensors to which the visual indicator is bound, and then uses that timing information to reduce power consumption in the receive circuits to a level that is amenable to battery operation for 5-8 years by powering receive circuits only for time periods when a transmission from a bound sensor is expected.

In some embodiments, the visual indicator includes a flip dot 104, such as provided by Scoretronics Inc. of Willowbrook, Ill., that is mated with a processor 120, the radio system 112, and an H-bridge 124, that control the operation of the flip dot 104. The visual indicator 24 of this embodiment also includes a regulator 128 between the battery 100 and processor 120, as well as switched capacitor boosters 132 and 134 that provide voltage required to operate the flip dot 104. A crystal 136 provides a clock base for the processor 136, in this embodiment. The flip dot 104, in some embodiments, has a red or orange highly reflective dot on a front side and is black on the back side. When the system 24 finds a sensor condition that is outside of a preset limit, the dot is flipped so that the colored side is visible from the exterior of the vehicle. The processor 120, in this exemplary embodiment, includes a memory that stores information related to operation of the processor and information related to the sensor(s) monitored by the apparatus. A separate memory may be used instead of, or in addition to, memory located on the processor 120. Such memory may include any suitable memory, and in one embodiment is a flash memory, although any type of volatile or non-volatile memory may be used that is appropriate for a particular application.

A flip dot display, as used in this exemplary embodiment, includes one or more metal disks that, as described above, are black (or a color that blends in with the surroundings) on one side, and a bright color on the other side. A power supply is connected to the flip dot display that causes the disk(s) to flip from one side to the other. In the exemplary embodiment of FIG. 3, the processor 120 provides a signal to the switched capacitor boosters 132, 134, and the H-bridge 124, which supply the requisite power to switch the state of the display. Once flipped, the disk(s) stay in position without needing any power. Within the flip dot display, the disk(s) is(are) attached to an axle which also carries a small permanent magnet. Positioned close to the magnet is a solenoid, and by pulsing the winding of the solenoid with the appropriate electrical polarity, the permanent magnet on the axle will align itself with the magnetic field and thereby turn the disc. Alternatively, a magnet may be embedded in the disk itself, with separate solenoids arranged at the ends or side to flip the disk.

As described above, the visual indicator is programmed to monitor only sensor(s) that are associated with the particular vehicle to which the visual indicator is mounted. In one embodiment, to set which sensors are monitored, the visual indicator is placed in close proximity to a sensor of interest (or the sensor is brought into close proximity to the visual indicator) and then a button or capacitive switch 140 is pressed. The visual indicator listens for RF energy and binds itself to that sensor, recording the unique ID of the sensor for later reference. In the event that the visual indicator receives signals from more than one sensor, the sensor with the strongest received signal strength (RSSI) is bound to the sensor. When all of the vehicle sensors have been bound, a user attaches the visual indicator to the exterior of the vehicle so that it can easily be seen by a person external to the vehicle. The visual indicator may be mounted to the vehicle using any of a number of appropriate mounting techniques, such as with double-sided tape, screws, rivets, mounting brackets, etc.

Once the visual indicator is bound to a sensor, it begins tracking all information from that sensor and records the sensor type. The visual indicator tags the time that the sensor was last read on and predicts a future time that the sensor will be transmitting again. When the sensor is read again a time delta is calculated to figure out the minimum time between transmit intervals. When this model is refined the visual indicator reduces the listen time so that the radio system only listens when a sensor is going to transmit. Such use of the radio system reduces power consumption of the visual indicator. In one embodiment, after a few sensor transmit intervals the visual indicator builds a drift model to further tighten the listen time by calculating how fast the transmit interval is moving with temperature or aging. This is referred to as an adaptive listening envelope. If a sensor is blocked for a period of time the visual indicator notes that the sensor model needs a full update and will schedule a reacquire interval where the radio system will remain active for a longer period of time in order to reacquire the signals from the bound sensors.

If more than one sensor is bound to the visual indicator, which is often the case, the visual indicator may, in some embodiments, adjust the adaptive listening envelope to serially listen for sensors during expected transmission times for respective sensors so that the same amount of power is used but the reaction time will be slower. In an exemplary embodiment, a typical single sensor system has a listen interval starting approximately every 2.5 seconds, yielding a response minimum time of 2.5 seconds. If two sensors are bound to the visual indicator, this time may double, and so on, so that many sensors are monitored without consuming significant, if any, additional power relative to monitoring of a single sensor. In many applications involving sensors associated with a single vehicle, the response times typically stay under one minute. The visual indicator, in some embodiments, may also monitor vehicle motion to see if the user interfaces need to be turned off or changed so that false bind requests may be ignored.

In one embodiment, LEDs 108 are used as a visual indicator to identify to a user when binding is occurring, and a change in the color of the LEDs may be used to indicate if the binding was successful. The LEDs, in some embodiments, may also be used in conjunction with light sensors, with a low light level triggering an augmentation to the visual indicator, such as through an LED blinking at night. Thus the visual indicator provides a system that is highly visible at night or day and that keeps power consumption at reduced levels. In other embodiments, test modes may be provided so that a change on a sensor can be used to verify whether that sensor is bound or not, or to test if the sensor is in range or not for mounting considerations.

As discussed above, some embodiments of the disclosure use a flip dot or other mechanical system that changes state based on information from signals received from one or more sensors. Such mechanical systems may use magnetization polarity of an iron rod to change the mechanical state of the indicator. This magnetization, in an embodiment, is formed by a roughly two millisecond (2 ms) current pulse in a coil (such as H-bridge 124 in FIG. 3) that is then turned off. For all time thereafter the mechanical indicator will stay in that position until the pole polarity is reversed. Therefore no power is used except when changing states. When a sensor reading is received that indicates an alarm condition for the sensor no longer exists, the state of the visual indicator is changed back to a non-alarm state.

Figure 4:
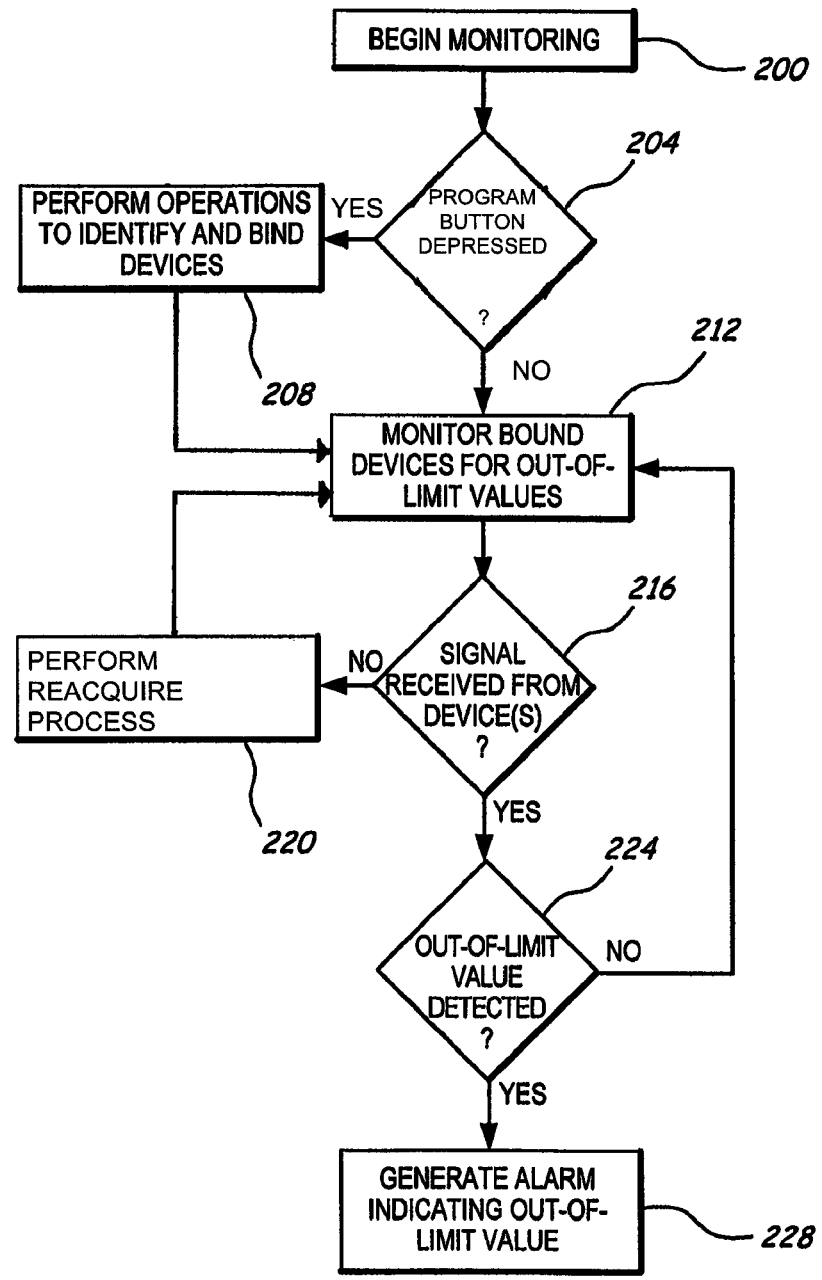
FIG. 4 is a flow chart diagram illustrating the operational steps for sensor monitoring and alarm generation for an embodiment.

With reference now to FIG. 4, the operational steps for monitoring of sensors are described for an exemplary embodiment. Monitoring begins according to block 200. Such monitoring may be initiated when the device is initially connected to a power source, such as batteries, or when a switch is depressed to put the device in an "ON" state. At block 204, a program button may be depressed that initiates operations to identify and bind a sensor that is in close proximity to the monitor, as indicated at block 204. Bound devices may be stored in a non-volatile memory, such as an EEPROM or flash memory, within the monitor. If one or more bound devices are stored in memory, the bound device(s) are monitored for out-of-limit values, as noted at block 212. The monitoring is performed by receiving RF signals from the bound device(s), the signals including information related to the current status of the sensor. If signals are received from bound devices at block 216, it is determined if the signals received indicate that the bound device has an out-of-limit value, as indicated at block 224. If a signal is not received from a bound device in block 216, the monitor in this embodiment performs a reacquire process as discussed above. As mentioned above, sensors may include tire pressure sensors that sense pneumatic tire pressure. The sensors periodically transmit an RF signal that includes information including the value of a sensor output along with limits for the sensor output. Such limits may be programmed into the sensor when the sensor is installed on a particular vehicle, such that limits may be different for different sensors. As the sensor transmits these limits along with the value of the sensor output, the monitor makes the out-of-limit evaluation based on the RF signal from the device. If an out-of-limit value is detected at block 224, the monitor generates an alarm indicating that a bound device has an out-of-limit value, as indicated at block 228. An operator or maintenance person may then take appropriate corrective action.

Figure 5:
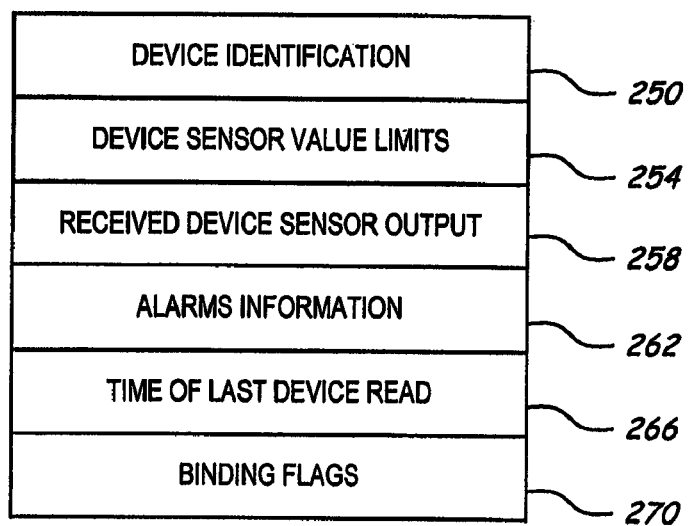
FIG. 5 is a block diagram illustration of a memory storage configuration for an embodiment.

As discussed above, sensors include an RF circuit that transmits an RF signal that includes, for example, information related to the status of the sensor, current value of the sensor output, limits for sensor values, and other information. As will be understood, the RF circuit of a sensor may transmit more, less, or different information. The monitor receives this information, and, in an embodiment, stores the information in memory. With reference now to FIG. 5, the storage of information from sensors in memory locations is described for an exemplary embodiment. In this embodiment, the monitor stores a number of different information fields in memory. The information fields include a device identification 250, that in an embodiment is a 32 bit identification code that is a unique code for each sensor. In such a manner, the monitor can identify each sensor, and any further information relative to a particular sensor may be stored in memory associated with the device identification 250. In this embodiment, device sensor value limits 254 are also received in the RF signals transmitted by a sensor, as mentioned above, and stored in memory. For example, a sensor may be a pneumatic tire pressure sensor, which transmits sensor value limits that correspond to a low tire pressure. More specifically, a tire pressure sensor may be mounted to each pneumatic tire on a set of dual wheels where each tire is to be inflated to 110 pounds per square inch (PSI) (758 kPa). The tire pressure sensor may be programmed to have a low value limit of 100 PSI (690 kPa). The pressure sensor transmits this low value limit in the RF transmission that is received by the monitor. Other types of sensors may have both high value limits and low value limits, while some further types of sensors may have only high value limits. In any event, the limit values for such sensors are transmitted in a similar manner, and stored in the monitor as device sensor value limits 254. In such a manner, the monitor may receive information from a number of different types of sensors without having to have limits for each different type of sensor programmed therein. Also, in many cases limits on sensor values may be dependent upon a particular configuration and associated equipment for the particular trailer on which the sensor is installed, and such information may be programmed into the sensor without having to also program this information in the monitor. In other embodiments, however, the monitor may be programmed with limits. Furthermore, in other embodiments, the sensor may be programmed to simply transmit a notification that a value for the sensed parameter is outside of a value limit, such as an error or warning flag, which the monitor reads to generate an alarm. With continued reference to the embodiment of FIG. 4, received device sensor output 258 corresponds to the value(s) of sensor output that are transmitted by the sensor to the monitor. Continuing with the tire pressure sensor example, the values of the sensor output correspond to the tire pressure in each of the inner and outer tires. In the event that one of the sensor values is outside of the value limits, the monitor generates an alarm. Alarms information 262 corresponds to information related to an alarm. In one embodiment, the alarm information is a byte of data stored in memory that indicates the presence of an alarm based on the value of the byte. The alarms information 262 may include other information such as a flag that is set in the event that a sensor value is outside of a value limit. Time of the last read of the device 266 includes information related to when the last successful read of the device occurred. In one embodiment, the time is stored in an hours-minutes-seconds format that corresponds to a clock maintained by the monitor. This information is used, in some embodiments as described above, to determine when and whether to treat a device as being bound. Binding flags 270 correspond to data indicative that the device is bound to the monitor or not. If a binding flag is set, this indicates that the device is bound to the monitor.

As will be readily recognized, numerous variations to the above described embodiments could be implemented and still maintain similar benefits. For example, inertial sensing such as accelerometers and RF received signal strength may also be used to adapt the system to changing conditions. Light brightness may be monitored so that the optimum condition state can be used at any given time. Such extra sensing systems could be done in various ways and therefore could change the parameters used to track sensors that are monitored. In some embodiments, the monitor may include a telemetry unit that transmits information to a remote entity indicating an alarm condition, providing a fleet operations center with an indication that a vehicle sensor is detecting an out-of-limit condition.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A sensor monitoring system comprising:
   a housing mountable to an exterior surface of a transport apparatus;
   a radio frequency (RF) receiver positioned at least partially within the housing, the RF receiver configured to receive RF signals from one or more sensors associated with the transport apparatus, the RF signals including information associated with an output of the one or more sensors;
   a processor positioned within the housing and communicatively coupled to the RF receiver, the processor configured to monitor the information associated with the output of the one or more sensors; and
   a visual alarm indicator positioned at least partially within the housing and communicatively coupled to the processor, the visual alarm indicator configured to be visible from an exterior of the transport apparatus, the visual alarm indicator further configured to receive power only when changing an indicated state and otherwise maintain the indicated state without receiving power,
   wherein responsive to detecting that the information associated with the output of the one or more sensors is outside of a predetermined limit, the processor is configured to change the indicated state of the visual alarm indicator,
   wherein the visual alarm indicator is configured to change state when the information from the received RF signals indicate a parameter is outside of the predetermined limit, and
   wherein the visual alarm indicator receives power when changing the indicated state.

2. The sensor monitoring system of claim 1, wherein the transport apparatus comprises a vehicle.

3. The sensor monitoring system of claim 1, wherein the RF signals further include information indicating the one or more threshold values.

4. The sensor monitoring system of claim 1, wherein the processor is further configured to determine when RF signals are expected to be received.

5. The sensor monitoring system of claim 4, wherein the processor is further configured to activate the RF receiver during time periods when the RF signals are expected to be received and deactivate the RF receiver during time periods when the RF signals are not expected to be received.

6. The sensor monitoring system of claim 1, wherein the one or more sensors are associated with at least one of a vehicle tire, vehicle hub, and vehicle axle.

7. The sensor monitoring system of claim 1, wherein the one or more sensors monitor air pressure in at least one vehicle tire.

8. The sensor monitoring system of claim 1, further comprising:
   a transmitter communicatively coupled to the processor and configured to communicate a status of the one or more sensors to a remote system that monitors a fleet of vehicles.

9. The sensor monitoring system of claim 1, wherein the visual alarm indicator comprises a flip dot display.

10. The sensor monitoring system of claim 1, wherein the processor is further configured to monitor a rate of drift of time between reception of RF signals from the one or more sensors.

11. The sensor monitoring system of claim 10, wherein the processor is further configured to adaptively change a listening envelope for the one or more sensors based on the rate of drift.

12. The sensor monitoring system of claim 1, further comprising:
   a self-contained power supply positioned at least partially within the housing and configured to provide power for a lifetime of the sensor monitoring system,
   wherein the lifetime is independent of a number of sensors that are monitored by the apparatus.

13. The sensor monitoring system of claim 1, further comprising:
   a programming input communicatively coupled to the processor and configured to direct the processor to activate the RF receiver and bind at least one sensor of the one or more sensors that is adjacent to the apparatus.

14. The sensor monitoring system of claim 1, further comprising:
   an RF transmitter communicatively coupled to the one or more sensors and configured to transmit RF signals including information associated with an output of the one or more sensors.

15. The sensor monitoring system of claim 14, wherein the information associated with the output of the one or more sensors comprise one or more values corresponding to sensed parameters of the transport apparatus.

16. A method of monitoring an output of one or more sensors associated with a transport apparatus, the method comprising:
   receiving, at a radio frequency (RF) receiver of a sensor monitoring system, RF signals from one or more sensors associated with the transport apparatus,
   wherein the RF receiver is configured to receive RF signals from the one or more sensors associated with the transport apparatus, and
   wherein the RF signals include information associated with an output of the one or more sensors;
   monitoring, by a processor of the sensor monitoring system, the information associated with the output of the one or more sensors;
   presenting an indicated state of a visual alarm indicator of the sensor monitoring system,
   wherein the indicated state of a visual alarm indicator is visible from an exterior of the transport apparatus,
   wherein the visual alarm indicator does not receive power and maintains the indicated state without receiving power,
   detecting, by the processor of the sensor monitoring system, that the information associated with the output of the one or more sensors is outside of one or more threshold values;
   responsive to detecting that the information associated with the output of the one or more sensors is outside of a predetermined limit, changing the indicated state of the visual alarm indicator,
   wherein the visual alarm indicator is configured to change state when the information from the received RF signals indicate a parameter is outside of the predetermined limit, and
   wherein the visual alarm indicator receives power when changing the indicated state.

\* \* \* \* \*